United States Patent [19]
Katahira et al.

[11] Patent Number: 5,228,353
[45] Date of Patent: Jul. 20, 1993

[54] BALL SCREW DEVICE

[75] Inventors: Masayuki Katahira; Taiji Honma, both of Maebashi, Japan

[73] Assignee: NSK, Ltd., Japan

[21] Appl. No.: 811,490

[22] Filed: Dec. 20, 1991

[30] Foreign Application Priority Data

Dec. 25, 1990 [JP] Japan .................. 2-405766
Jan. 21, 1991 [JP] Japan .................. 3-1314[U]
Mar. 13, 1991 [JP] Japan .................. 3-14377[U]

[51] Int. Cl.$^5$ ............................................ F16H 25/22
[52] U.S. Cl. ........................... 74/89.15; 74/424.8 R; 74/459; 384/43
[58] Field of Search ............... 74/89.15, 424.8 R, 459; 384/43

[56] References Cited

U.S. PATENT DOCUMENTS

| | | | |
|---|---|---|---|
| 3,258,983 | 7/1966 | Valenti | 74/424.8 R X |
| 3,331,469 | 7/1967 | Deflandre | 74/424.8 R X |
| 4,407,511 | 10/1983 | Benton et al. | 74/459 X |
| 4,438,986 | 3/1984 | Teramachi | 74/89.15 X |
| 4,597,305 | 7/1986 | Brusasco | 74/424.8 R X |
| 4,604,911 | 8/1986 | Teramachi | 74/89.15 X |
| 4,677,869 | 7/1987 | Mayfield | 74/424.8 R |
| 4,939,946 | 7/1990 | Teramachi | 74/89.15 |
| 5,094,118 | 3/1992 | Morita | 74/89.15 X |
| 5,121,647 | 6/1992 | Teramachi | 74/89.15 |

FOREIGN PATENT DOCUMENTS

62-165057 7/1987 Japan .

*Primary Examiner*—Leslie A. Braun
*Assistant Examiner*—Andrea Pitts
*Attorney, Agent, or Firm*—Pennie & Edmonds

[57] ABSTRACT

A ball screw device has a ball screw nut and a ball spline nut, both mounted on a shaft. Both the nuts are supported on a housing with ball bearings interposed therebetween. Inner race grooves of the ball bearings are formed on outer peripheral walls of the nuts, while outer race grooves of the ball bearings are formed on an inner peripheral wall of the housing. In another embodiment, ball insertion holes are formed through the nuts so that the ball insertion holes extend from inner peripheral walls of the nuts to the inner race grooves, respectively. The insertion holes are closed by plugs which were fitted in the insertion holes subsequent to the insertion of balls of the ball bearings through the insertion holes. In a further embodiment, a ball screw nut and a ball spline nut, both mounted on a shaft, are supported on a common housing by way of ball bearings, thereby constructing a ball screw device with a closed small space surrounded by the housing, ball screw nut, ball spline nut and shaft. Dust produced inside the ball screw device can be collected in the closed space and discharged directly through a suction hole formed through the housing.

7 Claims, 9 Drawing Sheets

BALL SCREW DEVICE

BACKGROUND OF THE INVENTION

1) Field of the Invention

This invention relates to ball screw devices suitable for use as actuators in machine tools, scalar robots or other industrial equipment, and especially to a ball screw device small in dimensions, light in weight, excellent in performance and durability and convenient in use and also to a ball screw device capable of inhibiting lubricant scattering to the outside, thus effectively meeting the demand for a cleaner ball screw device.

2) Description of the Related Art

Figure 1:
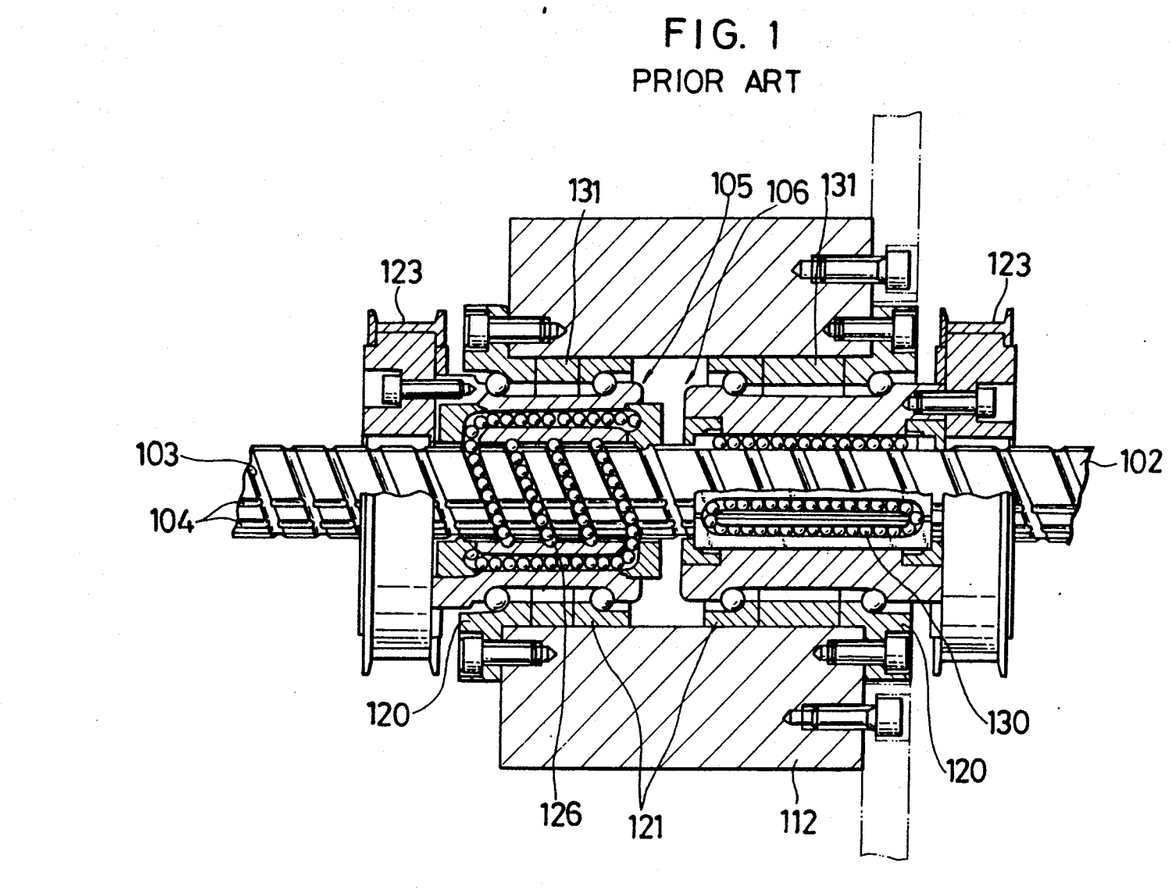
FIG. 1 is an axial cross-section of a conventional ball screw device.

A conventional ball screw device of the above type is disclosed, for example, in U.S. Pat. No. 4,939,946 issued on Jul. 10, 1990. As is illustrated in FIG. 1, on a single shaft 102 provided with a ball screw groove 103 and ball spline grooves 104 formed on an outer peripheral wall thereof, a ball screw nut 105 is fitted with a number of balls 126 interposed therebetween and a ball spline nut 106 is also fitted by way of a number of balls 130 interposed therebetween. Both the nuts 105,106 are rotatably assembled on a common housing 112, each by means of a combination of support bearings 120,121. Pulleys 123,123 are also provided to drive the nuts 105,106 independently of each other. The support bearings 120,121 in each combination are constructed as angular contact bearings and are arranged in a back-to-back relationship. Interposed between the respective bearings 120,121 are spacers 131 so that a so-called tensile pre-load is applied to balls of the support bearings 120,121. The pre-load is adjustable by choosing spacers 131 of appropriate axial width. This adjustment of the pre-load is said to prevent the development of rattling due to elastic deformation of the balls even when the shaft 102 is suddenly stopped during reciprocation. The interposition of the spacers 131, however, has led to an increase in the number of parts. Moreover, it is impossible to reduce the radial thickness of the spacers 131 so that the ball screw device unavoidably has a greater outer diameter. In addition, the nuts 105,106 have a longer axial dimension because of the inclusion of the spacers 131. As a consequence, the ball screw device cannot avoid an appreciable increase in overall external dimensions.

As described above, the support bearings 120,121 which in combination support the ball screw nut 105 or the ball spline nut 106 are constructed as angular contact bearings. The support bearings 120,121 in each combination are arranged in the back-to-back relationship (DB arrangement) with the spacer 131 interposed therebetween, whereby a so-called tensile pre-load is applied. The construction of the conventional ball screw device described above is, therefore, accompanied by the problem that it does not provide any freedom in choosing the function of the ball screw device, in other words, it does not allow the support bearings to be arranged in a face-to-face relationship (DF arrangement) to apply a compressive pre-load or to use oversized balls slightly greater than the space of the ball grooves, thus enabling each ball to provide contact with its associated ball groove at four points, to apply a so-called "P pre-load".

Further, in the conventional ball screw device described above, neither the ball screw nut 105 nor the ball spline nut 106 is provided with any particular oiling system for the lubrication of the balls but relies merely on grease being applied. Filling of excess grease may result in grease scattering to the outside so that the outside may be contaminated. On the other hand, inadequate greasing may lead to poor lubrication and may hence require frequent grease replenishment, resulting in the problem that its maintenance would be time-consuming.

For example, when a robot equipped with such a ball screw device is used in a clean room, it is of extreme importance to prevent possible contamination of the clean room by scattered lubricant. This has conventionally been dealt with by simply applying to bearings a grease of high viscosity and high adhesion. This grease, however, presents the problem that it is inferior in lubrication life and rust-prevention to general grease.

There is also the practice of continuous evacuation of a ball screw device by a vacuum means while using general grease, so that any scattering of lubricant can be prevented. In such a conventional evacuation method, the ball screw device is enclosed in a casing and the entire interior of the casing is evacuated. This, however, requires the evacuation of a large space, resulting in the problem that the evacuation is not fully effective to prevent lubricant scattering, even with provision of a large vacuum means.

SUMMARY OF THE INVENTION

The present invention has been completed with the foregoing in view. A first object of this invention is, therefore, to provide a compact and low-cost ball screw device which provides increased freedom in selecting the function, permits reductions in the numbers of parts and assembly steps, allows increased assembly accuracy, and is convenient to use.

A second object of this invention is to provide a ball screw device equipped with a compact and efficient means for the prevention of lubricant scattering.

A third object of this invention is to provide a compact and light-weight ball screw device, which is excellent in performance and durability and is convenient to use, by providing ball insertion holes at locations such that plugs to be inserted in the ball insertion holes would be free from collision by balls rolling at a high speed and the fixing strength for the plugs can be reduced to permit the use of a thinner housing.

In a first aspect of this invention, there is thus provided a ball screw device comprising a shaft provided with a ball screw groove and a ball spline groove, a ball screw nut and a ball spline nut mounted on the shaft via balls interposed therebetween, and a housing having an inner wall on which the ball screw nut and ball spline nut are rotatably supported by the virtue of rotation of balls of ball bearings. Inner race grooves of the ball bearings are formed in outer peripheral walls of the ball screw nut and ball spline nut, respectively. Outer race grooves of the ball bearings are formed in the inner peripheral wall of the housing at desired intervals relative to corresponding intervals of the inner race grooves.

The ball bearings may include over-sized balls. The ball screw device may additionally include an oil scraper threadedly mounted on the shaft between the ball screw nut and the ball spline nut.

In a second aspect of this invention, there is also provided a ball screw device comprising a shaft provided with a ball screw groove and a ball spline groove, a ball screw nut and a ball spline nut mounted on the shaft via balls interposed therebetween, and a housing having an inner wall on which the ball screw nut and ball spline nut are rotatably supported by the virtue of rotation of balls of ball bearings. A suction hole is provided through the housing to permit direct evacuation of a closed space surrounded by the housing, ball screw nut, ball spline nut and shaft. Sealing members are arranged on outer peripheries of the ball screw nut and ball spline nut, whereby the closed space is isolated. Preferably, suction holes—which are open in the vicinity of outer end portions of the ball screw nut and ball spline nut and are communicated with the closed space via a clearance between the ball screw nut and the shaft and a clearance between the ball spline nut and the shaft, respectively—are formed through the outer end portions of the ball screw nut and ball spline nut and are open at outer peripheral walls of the outer end portions or are formed through spacers mounted on axial outer sides of the ball screw nut and ball spline nut and are open at outer peripheral walls of the spacers.

In a third aspect of this invention, there is also provided a ball screw device comprising a shaft provided with a ball screw groove and a ball spline groove, a ball screw nut and a ball spline nut mounted on the shaft via balls interposed therebetween, and a housing having an inner wall on which the ball screw nut and ball spline nut are rotatably supported by the virtue of rotation of balls of ball bearings. Outer race grooves of the ball bearings are formed in the inner peripheral wall of the housing. Inner race grooves of the ball bearings are formed in outer peripheral walls of the ball screw nut and ball spline nut, respectively. Ball insertion holes communicating with the inner race grooves of the ball bearings are formed from inner peripheral walls of the ball screw nut and ball spline nut. Plugs are inserted in the insertion holes so that the plugs close the insertion holes without falling out.

The ball screw device according to the first aspect of this invention permits easy selection of DB-type pre-loading, DF-type pre-loading or P-type (4-point contact type) pre-loading, as desired, without the need for the use of any spacer. This has resulted in a reduction in the number of parts, thereby achieving a reduction in the number of assembly steps and also an improvement in the accuracy of assembly. Other benefits also achieved include reductions in dimensions, a reduction in manufacturing cost, and an improvement in the convenience in use. Owing to the provision of the oil scraper threadedly mounted on the screw between the ball screw nut and the ball spline nut, it is also possible to avoid the potential problem of external contamination—which would take place should too much lubricating grease be applied—or to obviate the labor needed for maintenance such as frequent replenishment of the lubricating grease should it be used sparingly.

In the ball screw device according to the second aspect of this invention, dust produced at the ball screw nut, ball spline nut and/or bearings is introduced into the closed space of the small volume surrounded by the housing, ball screw nut, ball spline nut and shaft. The closed space is directly evacuated. It is therefore possible to efficiently discharge the dust even with a small vacuum means. Owing to the construction described above, the space required for the exhaust means can be substantially reduced compared to conventional designs. This has resulted in the advantage that the efficient prevention of lubricant scattering can be achieved by a compact exhaust means. Moreover, it is no longer necessary to use grease of especially low scattering tendency unlike the conventional ball screw devices. An adequate quantity of general grease can be used, theretofore, with gains in both lubricating life and rust prevention performance, thereby bringing the advantage that the time and labor required for maintenance can be reduced.

In the ball screw device according to the third aspect of this invention, the ball insertion holes are provided not on the side of the outer races of the bearings but on the side of the inner races of the bearings. This has made it possible to set at a minimum necessary level the thickness of the housing which serves as the outer races, whereby the outer diameter of the ball screw device can be reduced to easily achieve both size and weight reduction. When the weight of a ball screw device is reduced by making such a part smaller and lighter, the inertia of the ball screw device with the part assembled therein can be reduced. Further, the ball insertion holes remain free from the centrifugal force of the balls rotating at a high speed. It is therefore unnecessary to very firmly fix the plugs by which the ball insertion holes are closed. Moreover, the balls are free from the potential problems of rattle and/or wear due to striking the steps between end edges of the ball insertion holes and corresponding end faces of the plugs. As a consequence, both performance and durability can be improved. Further, the roller insertion holes do not impose any limitation on the positions of flanges on which drive pulleys are mounted. This has led to increased freedom in choosing the positions of the drive pulleys, thus making it convenient to use the ball screw device. Since centrifugal force of the rollers is not applied to the plugs, the plugs themselves may be light in weight and permit easy attachment. Formation of the plugs with a synthetic resin makes it possible to produce light-weight plugs in a large volume at lost cost and further to enable the plugs to be press-fitted. This can reduce the number of assembly steps and hence improve productivity.

DETAILED DESCRIPTION OF THE INVENTION AND PREFERRED EMBODIMENTS

Figure 2:
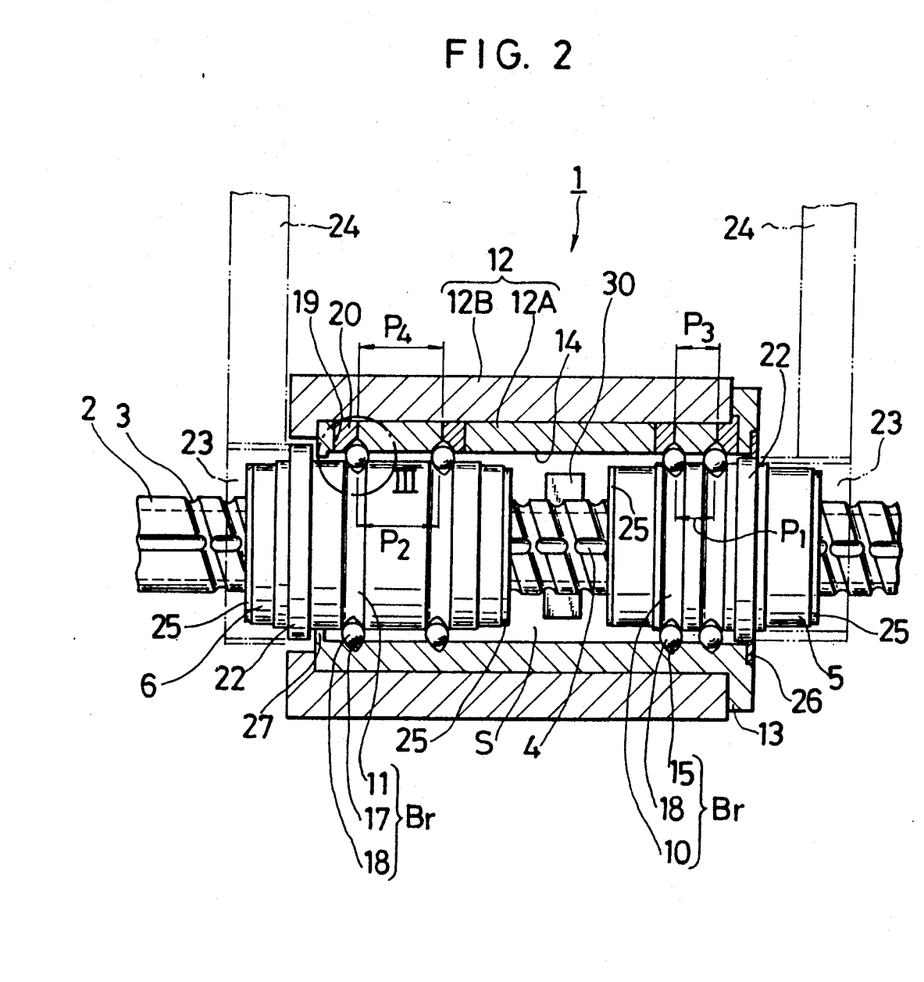
FIG. 2 is an axial cross-section of a ball screw device according to a first embodiment of this invention.
Figure 3:
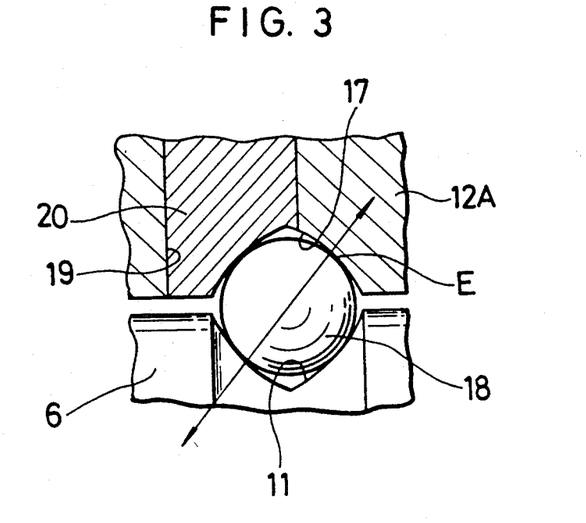
FIG. 3 is an enlarged cross-section of a part indicated by III in FIG. 2.
Figure 4:
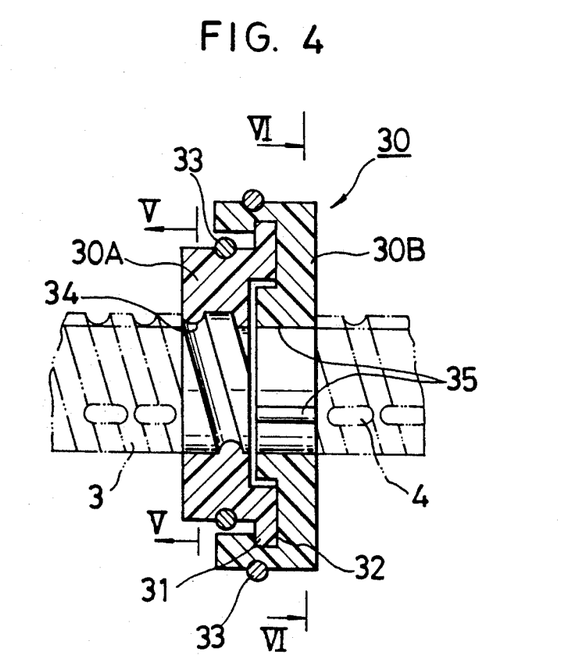
FIG. 4 is an axial cross-section of an oil scraper shown in FIG. 2.
Figure 5:
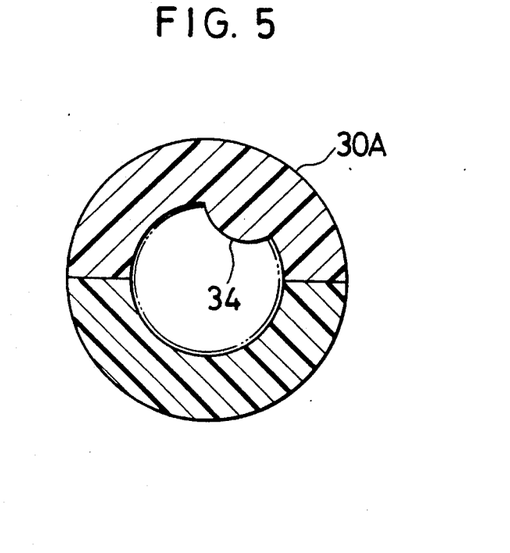
FIG. 5 is a cross-section of the oil scraper, taken in the direction of arrows V—V of FIG. 4.
Figure 6:
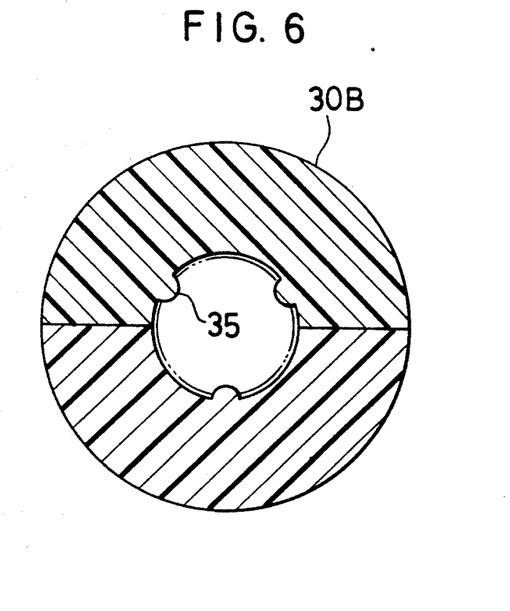
FIG. 6 is a cross-section of the oil scraper, taken in the direction of arrows VI—VI of FIG. 4.

The embodiments of this invention will hereinafter be described with reference to the accompanying drawings, in which FIG. 2 through FIG. 6 pertain to the first embodiment of this invention. The outline of the ball screw device 1 is shown in FIG. 2. In the drawing, numeral 2 indicates a shaft on which a helical ball screw groove 3 and three axial linear ball spline grooves 4, each in the form of a Gothic arch groove, are formed. A ball screw nut 5 and a ball spline nut 6 are both mounted on the shaft 2.

The ball screw nut 5 is provided with an unillustrated ball screw groove formed in an inner peripheral wall thereof. The unillustrated ball screw groove has a Gothic arch configuration corresponding to the ball screw groove 3. Between the unillustrated ball screw groove of the nut 5 and the ball screw groove 3, a number of balls (not shown) are interposed for rotation. Accordingly, the ball screw nut 5 is also provided with a recirculation path for these balls although it is not illustrated. As the shaft 2 and the ball screw nut 5 rotate relative to each other, the balls move helically while rolling in the screw grooves and, after turning one and a half times or three and a half times around the shaft 2, return to the original position through a return path in the nut 5. The balls repeat this recirculation. In this respect, the ball screw device has a conventional structure. Two grooves 10 in the form of Gothic arch grooves, which will hereinafter be referred to as the "inner race grooves 10", are also formed in parallel to each other at an interval of $P_1$ on a cylindrical outer peripheral wall of the ball screw nut 5.

On the other hand, the ball spline nut 6 is provided with unillustrated ball spline grooves formed in an inner peripheral wall thereof. These unillustrated ball spline grooves correspond to the ball spline grooves 4 which extend linearly along the shaft 2. Between the unillustrated ball spline grooves of the nut 6 and the corresponding ball spline grooves 4 on the shaft 2, a number of unillustrated balls are interposed for rotation. Accordingly, the ball spline nut 6 is also provided with a recirculation path for these balls although it is not shown. As the shaft 2 and the ball spline nut 6 linearly move relative to each other, the balls linearly move while rolling in the ball spline grooves and, after reaching an axial end of the nut 6, enter a return path formed inside the nut 6, take a U-turn and return to the original position. The balls repeat this recirculation. Two grooves 11 in the form of Gothic arch grooves, which will hereinafter be referred to as the "inner race grooves 11", are also formed in parallel to each other at an interval of $P_2$ on a cylindrical outer peripheral wall of the ball spline nut 6.

A common housing 12 is mounted on the outer peripheral walls of the ball screw nut 5 and ball spline nut 6 threaded on the shaft 2. This housing 12 has a double-wall structure which consists of an inner housing 12A and an outer housing 12B. The inner housing 12A has a flange 13 at one end thereof. On an inner peripheral wall 14 of the inner housing 12A, two grooves 15 having a Gothic arch configuration, which will hereinafter be referred to as the "outer race grooves 15", are formed in parallel to each other at an interval of $P_3$ corresponding to the inner race grooves 10 of the ball screw nut 5 and two grooves 17 also having a Gothic arch configuration, which will hereinafter be referred to as the "outer race grooves 17", are formed in parallel to each other at an interval of $P_4$ corresponding to the inner race grooves 11 of the ball spline nut 6. One or both walls of each Gothic arch groove can therefore be used as rolling surface or surfaces for the associated balls. A number of bearing balls 18 are disposed in the groove spaces defined by the inner race grooves 10 and the corresponding outer race grooves 15 and also in the groove spaces defined by the inner race grooves 11 and the corresponding outer race grooves 17. Insertion of these bearing balls 18 are conducted through ball insertion holes 19 bored in advance through the cylindrical wall of the inner housing 12A. The insertion can be effected in the following manner. In the cylindrical wall of the inner housing 12A, through-holes large enough to permit the insertion of the bearing balls 18 therethrough are formed in registration with the respective outer race grooves 15,17 other than tilted walls, i.e., groove flanks on the side of ball-contacting points E of the outer race grooves 15 (see FIG. 3), whereby the ball insertion holes 19 are formed. Subsequent to insertion of the bearing balls 18 through the ball insertion holes 19 as many as needed, plugs 20 are fitted in the respective ball insertion holes 19 to close the same. In this manner, ball bearings Br are constructed by the inner race grooves 10, outer race grooves 15 and bearing balls 18 and ball bearings Br are also constructed by the inner race grooves 11, outer race grooves 17 and bearing balls 18. The ball screw nut 5 and ball spline nut 6 therefore serve as inner races for the ball bearings Br, while the inner housing 12A of the housing 12 serves as a common outer race for the ball bearings Br.

In the first embodiment described above, the interval $P_3$ between the outer race grooves 15,15 on the side of the ball screw nut 5 is slightly greater than the interval $P_1$ between the corresponding inner race grooves 10,10 ($P_1 < P_3$). Further, the interval $P_4$ between the outer race grooves 15,15 on the side of the ball spline nut 6 is slightly greater than the interval $P_2$ of the corresponding inner race grooves 11,11 ($P_2 < P_4$) By off-setting the intervals of the inner race grooves with the intervals of the corresponding outer race grooves as described above, the bearing balls 18 are subjected to a similar tensile pre-load to that applied in the DB arrangement for angular contact ball bearings.

By reversing the relationships between the intervals $P_1, P_2$ and the corresponding intervals $P_3, P_4$ (i.e., setting the relationships as $P_1 > P_3$ and $P_2 > P_4$), it is possible to apply a similar compressive pre-load to that available in the DF arrangement for angular contact ball bearings. Further, by making the intervals equal ($P_1 = P_3$, $P_2 = P_4$) or providing each nut with a single inner race groove and a single outer race groove and inserting bearing balls slightly greater than the groove space formed by the inner race groove and the outer race groove to have each of the bearing balls contacted at four points, a P pre-load can be applied (in this case, it is preferable to alternately insert spacer balls of a smaller diameter for improved operability).

Ring-shaped, pulley-fixing flanges 22 are provided on the outer peripheral walls of the ball screw nut 5 and ball spline nut 6 at locations adjacent the axial outer ends of the nuts 5,6, respectively. Pulleys 23,23 are mounted on the flanges 22,22, respectively. These pulleys 23,23 can be driven by an unillustrated drive unit by way of timing belts 24,24 for precision power transmission. Numeral 25 indicates wiper seals mounted on opposite ends of the ball screw nut 5 and on those of the ball spline nut 6. Designated at numeral 26 is a wiper seal attached to the end face of the inner housing 12A on the side of the flange 13. Numeral 27 identifies a labyrinth seal formed on the other end face of the housing 12A, which end face is opposite to the end face carrying the wiper seal 26 attached thereto.

In the first embodiment, an oil scraper 30 is threadedly mounted on the shaft 2 between the ball screw nut 5 and the ball spline nut 6. Details of the oil scraper 30 will now be described with reference to FIG. 4 through FIG. 6. The oil scraper 30 comprises in combination an oil scraper portion 30A for the ball screw groove 3 and another oil scraper portion 30B for the ball spline grooves 4. The oil scraper portion 30A has a flange 31 on an outer periphery thereof, while the oil scraper portion 30B defines therein a slot 32 maintained in engagement with the flange 31. The oil scraper portions 30A,30B are each composed of two members made of a low-friction synthetic resin and bound together by a resilient member 33 such as an 0-ring. These two members were formed by diametrically cutting a ring-shaped body into two equal parts. A ridge 34 maintained in engagement with the ball screw groove 3 of the shaft 2 is formed on an inner peripheral wall of the oil scraper part 30A. On the other hand, three ridges 35 maintained in engagement with the three ball spline grooves 4 of the shaft 2, respectively, are formed on an inner peripheral wall of the oil scraper portion 30B.

Operation of the ball screw device according to the first embodiment will be described next.

The ball screw device 1 described above can be mounted, for example, by securing the housing 12 to a mount of an unillustrated machine tool, robot or the like. The shaft 2 can be driven by rotating the pulleys 23 by way of the corresponding timing belts 24. When the ball screw nut 5 alone is rotated, the shaft 2 is caused to move in the axial direction. When the ball spline nut 6 alone is rotated, the shaft 2 is allowed to move axially while rotating. When the ball screw nut 5 and the ball spline nut 6 are both rotated at the same revolution number in the same direction, the shaft 2 is caused to rotate without axial movement. When the ball screw nut 5 and the ball spline nut 6 are driven at different revolution numbers, the shaft 2 is caused to undergo combined motion of rotary motion and axial motion. When the directions of their rotations are reversed, the respective motions are reversed in direction. During these motions, the ball bearings Br are pre-loaded so that the shaft 2 is prevented from rattling. As a result, the shaft 2 is assured to perform smooth motion and to provide high positioning accuracy. The first embodiment, therefore, permits the selection of a desired type of pre-loading by simply changing the interval between the inner race grooves 10,11 or between the outer race grooves 15,17 upon their formation, for example, by forming them to apply a tensile pre-load when desired to enhance especially the moment rigidity of the ball spline nut 6 or to apply a compressive pre-load for the ball screw nut 5 having low resistance to twisting or by forming single-row grooves to apply a P pre-load when a space reduction is required, whereby the type of pre-loading can be chosen as desired without the need for replacement of all the parts.

Different from the ball bearings of the angular contact design in the conventional example, the ball screw device according to the first embodiment does not require any spacer so that it needs fewer parts and can be easily assembled with good accuracy. In addition, as has been described above, it is easy to choose its performance, for example, not only tensile pre-loading but also compressive pre-loading or P pre-loading. This enables ball screw device to provide timal performance in accordance with its use condition. Further, P pre-loading based on single-row grooves enables to obtain an extremely compact product, thereby also making it possible to meet the demand for space saving.

Figure 7:
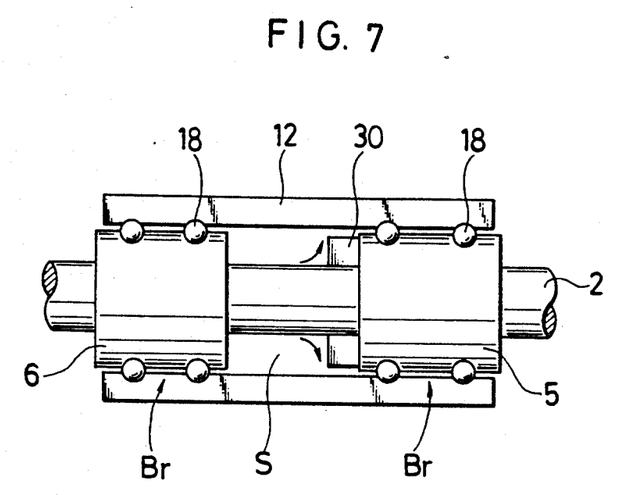
FIG. 7 is a simplified schematic illustration showing the function of the oil scraper.

A description will next be made of the lubrication of the ball screw device. Neither the ball screw nut 5 nor the ball spline nut 6 is intentionally filled with grease. The space S between the nuts 5,6 is used as a grease sump. The oil scraper 30 is arranged so that it is allowed to freely move on the shaft 2 between the nuts 5,6. While being dragged by the moving shaft 2, the oil scraper 30 moves between the nuts 5,6 and, as schematically shown in FIG. 7, comes into contact with the inner end of one of the nuts 5,6 and stops there. Further continuous movement of the shaft 2 allows the oil scraper 30 to scrape up grease from the shaft 2, so that the grease accumulates on a side wall of the oil scraper 30 and the peripheral wall of the shaft 2 passed through the oil scraper 30 is coated with a small amount of the grease. It is thus possible to minimize the leakage of excessive grease to the outside. In addition, surplus grease remains within the space S as the grease sump and adheres the oil scraper 30, thereby substantially reducing the oiling frequency compared to the conventional ball screw devices.

Furthermore, the wiper seal 26 and labyrinth seal 27 provided at the opposite end portions of the inner housing 12A, respectively can minimize the leakage of the grease to the outside from the space S as the grease sump. This manner of lubrication is free of the conventional problem that excess grease may be filled in each of the nuts 5,6 and may scatter out to cause contamination or, in contrast, the nuts 5,6 tend to be lubricated with insufficient grease thus requiring frequent replenishment. The maintenance of the ball screw device does not require labor.

Figure 8:
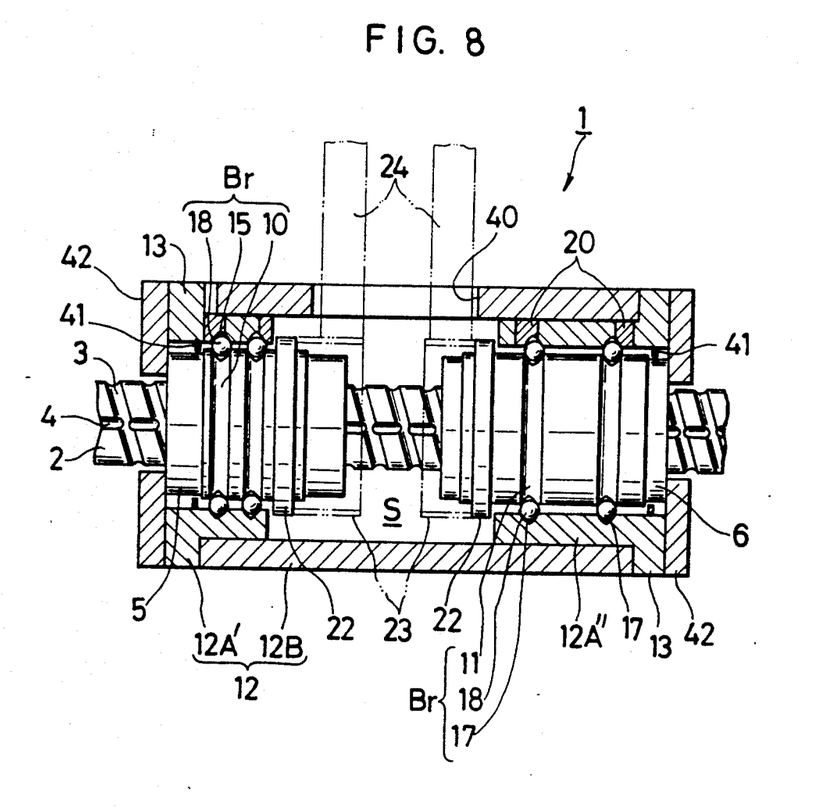
FIG. 8 is an axial cross-section of a ball screw device according to a second embodiment of this invention.

The ball screw device according to the second embodiment of this invention will next be described with reference to FIG. 8.

In the second embodiment, the inner housing 12A provided with the outer race grooves 15 formed therein is not common to the ball screw nut 5 and ball spline nut 6 but is divided into two short sections, namely, an inner housing 12A' for the ball screw nut 5 and another inner housing 12A" for the ball spline nut 6. Pulleys 23,23 are mounted on the inner ends of the ball screw nut 5 and ball spline nut 6, said inner ends facing each other. An opening 40 is centrally formed in the outer housing 12B so that the belts 24,24 extend out through the opening 40. The second embodiment is different from the first embodiment in that the distance between the two timing belts 24,24 for driving and rotating the respective nuts 5,6 is designed short. Sealing shims 41,41 in the form of thin plates are press-fitted in outer end portions of the respective inner housings 12A',12A" with a view toward preventing the grease from leaking from the space S as the grease sump to the outside. Numeral 42 indicates protectors bolted to the flanges 13 provided on the outer end portions of the respective inner housings 12A',12A".

Operation and advantages of the ball screw device according to the second embodiment are substantially same as those of the first embodiment described above.

The ball screw device according to the third embodiment of this invention will next be described with reference to FIG. 9, in which elements of structure similar to those of the first embodiment shown in FIGS. 2 through 6 are identified by like reference numbers and their description is omitted herein. It is to be noted that the positions of the ball screw nut 5 and the ball spline nut 6 in the third embodiment are opposite to their positions in the first embodiment depicted in FIG. 2.

Figure 9:
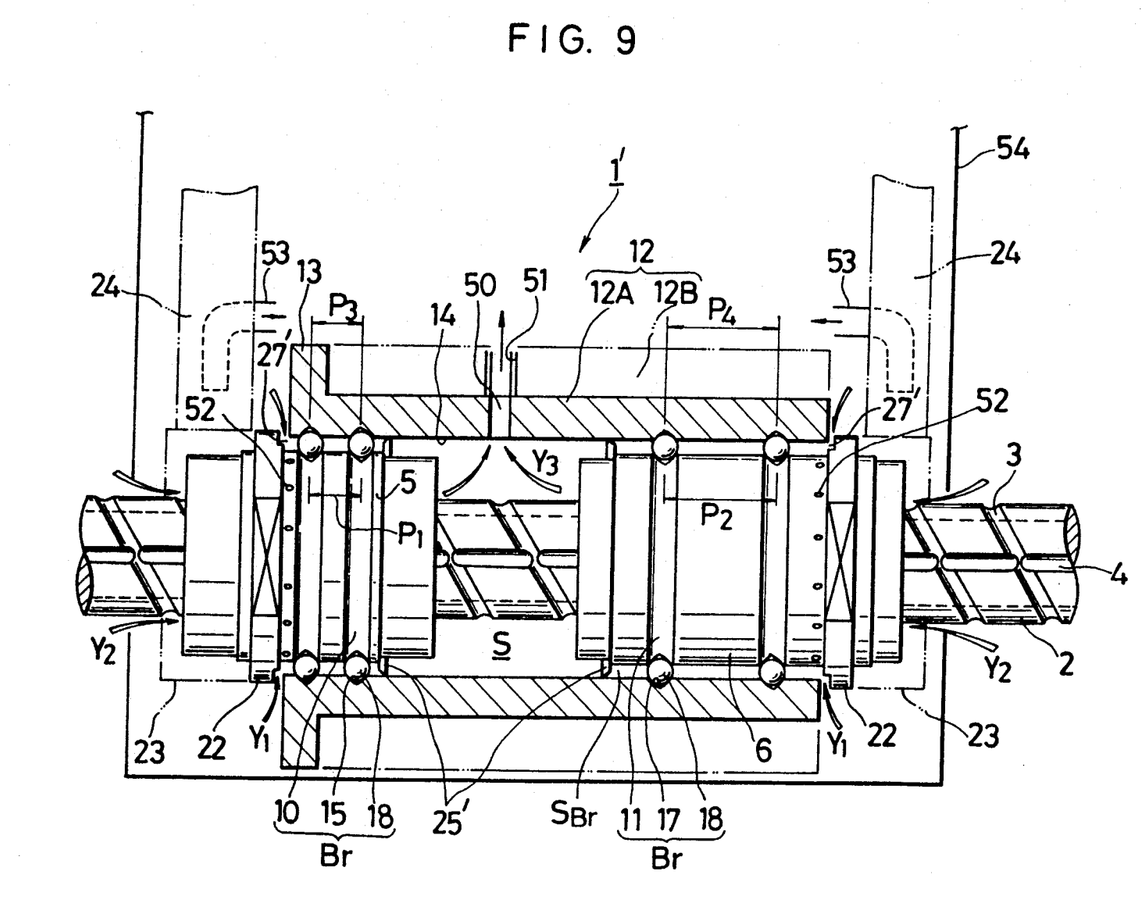
FIG. 9 is an axial cross-section of a ball screw device according to a third embodiment of this invention.

In FIG. 9, inner peripheral edge portions of the respective pulley-fixing flanges 22 are cut off to present steps. Small clearances are, therefore, formed between these steps and corresponding axial end portions of the inner peripheral wall of the inner housing 12A, whereby labyrinth seals 27' are formed. Further, contact-type annular sealing members 25',25' are fitted on the outer peripheral walls of the ball screw nut 5 and ball spline nut 6 at locations adjacent their inner end portions, respectively. Lips of these sealing members 25' are maintained in slidable contact with the inner peripheral wall of the inner housing 12A so that the sealing members 25' isolate the closed space S—which is surrounded by the housing 12, the ball screw nut 5 and the ball spline nut 6—and internal spaces $S_{Br}$ of the respective bearings Br from each other.

To directly evacuate the closed space S so isolated, there is provided a suction opening 50 which extends through the cylindrical wall of the housing 12 and opens into the closed space S. The suction hole 50 is provided with a suction nozzle 51 which is in turn connected to an unillustrated vacuum system. In addition, many suction holes 52 are provided at equal angular intervals in the outer peripheral walls of the ball screw nut 5 and ball spline nut 6 along outer end peripheries oft he nuts 5,6. These suction holes 52 are open in the vicinity of outer end portions of the bearings Br. These suction holes 52 communicate to the closed space S via the clearance between the ball screw nut 5 and the shaft 2 and that between the ball spline nut 6 and the shaft 2. Suction nozzles 53,53 connected to an unillustrated vacuum system are also arranged in the spaces defined by the pulleys 23,23 and the corresponding timing belts 24,24, respectively.

The ball screw device 1' according to the third embodiment of this invention constructed as described above is accommodated, for example, in a casing 54 like an arm case of a robot. Operation of the ball screw device 1' is similar to that of the ball screw device 1 of the first embodiment except for the evacuation of the closed space S.

The evacuation of the closed space S will be described hereinafter.

Upon operation of the ball screw device 1', the unillustrated vacuum system is actuated so that dust produced due to friction between the pulleys 23 and the corresponding timing belts 24 is drawn out through the suction nozzle 53. At the same time, the air inside the closed space S of the housing 12 is also drawn through the suction nozzle 51 by way of the suction opening 50, together with dust including mist of the lubricant. Although the closed space S is depressurized by this suction, the air inside the internal spaces $S_{Br}$ of both the bearings Br is sealed by the contact-type sealing members 25',25' so that the air does not flow directly into the closed space S. The suction holes 52 formed in the outer peripheral walls of the ball screw nut 5 and ball spline nut 6 at the locations adjacent the axial end portions of the nuts 5,6 are open in the vicinity of the outer ends of the respective bearings Br,Br. The dust produced inside the bearings Br,Br is, therefore, drawn through the suction holes 52 together with streams $Y_1$ of air flowed through the respective labyrinth seals 27,27 immediately before the dust flows outside. The dust drawn through the suction holes 52 merges into streams $Y_2$ of air drawn from the outside of the casing 54, flows into the closed space S through the clearance between the ball screw nut 5 and the shaft 2 and also the clearance between the ball spline nut 6 and the shaft 2, is discharged together with a stream $Y_3$ of air through the suction opening 50 and is then separated by a filter via an unillustrated vacuum pump. After the removal of the dust, the air is released into the atmosphere. According to the third embodiment, dust produced inside the bearings Br,Br and that produced inside the ball screw nut 5 and the ball spline nut 6 are both discharged without scattering into the outside of the housing 12 so that the clean room can be protected completely from contamination. Moreover, the space to be evacuated is much smaller than those in conventional designs so that the space can be sufficiently evacuated by a small vacuum means. Further, the evacuation can be effectively carried out. It is hence unnecessary to choose grease of especially high adhesion so that the lubrication life and rust preventive property can be improved.

Figure 10:
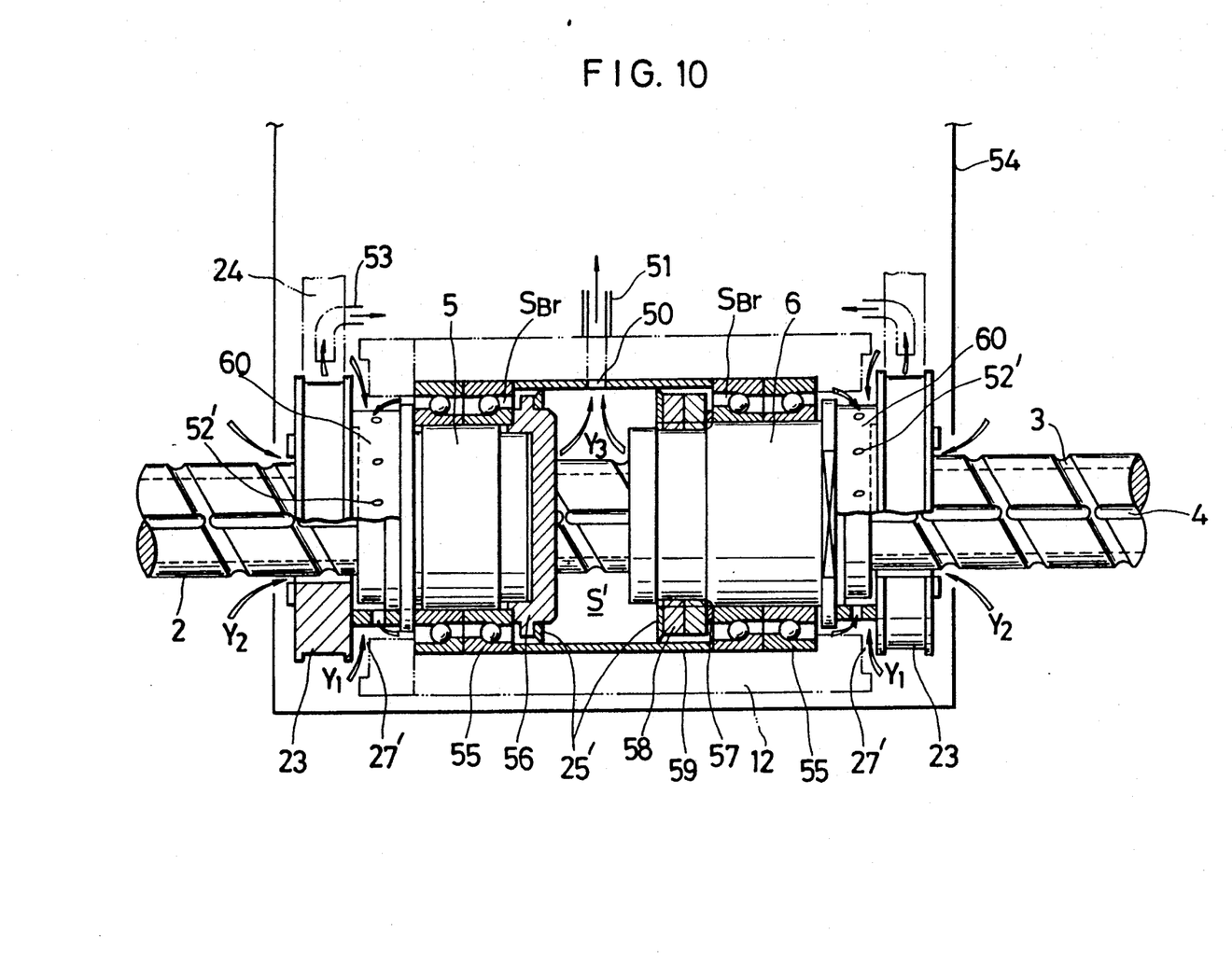
FIG. 10 is an axial cross-section of a ball screw device according to a fourth embodiment of this invention.

Now, the ball screw device according to the fourth embodiment of this invention will be described with reference to FIG. 10.

In the fourth embodiment, as bearings for rotatably supporting each of the ball screw nut 5 and ball spline nut 6, two angular contact ball bearings 55,55 are arranged in a back-to-back relationship. The angular contact ball bearings 55,55 for the ball screw nut 5 are retained by an inner race holder 56, while the angular contact ball bearings 55,55 for the ball spline nut 6 are retained by a double nut 58 by way of a spacer 57. In addition, a spacer 59 is interposed between proximal peripheral end faces of outer races arranged in opposition to each other with an axial interval therebetween.

The fourth embodiment is, therefore, different from the third embodiment in that the suction holes 52 are not directly formed in the ball screw nut 5 and ball spline nut 6. Namely, cylindrical spacers 60,60 are mounted on outer peripheral end portions of the ball screw nut 5 and ball spline nut 6, respectively. Second suction holes 52',52' are formed in the spacers 60,60. According to the fourth embodiment, it is unnecessary to directly form the suction holes 52',52' in the ball screw nut 5 and the ball spline nut 6 by special machining. The spacers 60,60 in the form of discrete parts can be easily machined to provide them with the suction holes 52',52', leading to the advantage that the manufacturing cost can be reduced. The remaining construction and operation are substantially the same as those of the third embodiment described above.

In the third and fourth embodiments described above, the sealing members 25' isolating the bearings Br,Br or the angular contact ball bearings 55,55 and the closed space S or S' from each other were in the form of the contact seals and the suction holes 52 or 52' are formed in the ball screw nut 5 and ball spline nut 6 or in the spacers 60,60. It should, however, be borne in mine that the present invention is not necessarily limited thereto. The suction holes 52 or 52' are not essential. When they are omitted, it is desirable to form non-contact seals between the sealing members 25',25', which are arranged on the outer peripheral walls of the ball screw nut 5 and ball spline nut 6, and the inner peripheral wall of the housing 12, because the external air can also flow into the closed space S or S' through the sealing gap between each sealing member 25' and the inner peripheral wall of the housing 12 so that each stream of air into the closed space S or S' can be divided with a good balance into two steams, one being the stream flowing through a space in the bearing and then through the sealing gap and the other a stream flowing through the clearance between the ball screw nut 5 (or ball spline nut 6) and the shaft 6. As a result, dust produced in the bearings Br,Br, angular contact ball bearings 55,55 or the like can be all drawn and discharged.

In the third and fourth embodiments described above, the bearings Br,Br and the angular contact ball bearings 55,55 were in the form of ball bearings using balls as rolling elements. Roller bearings making use of rollers as rolling elements can also be used.

Figure 11:
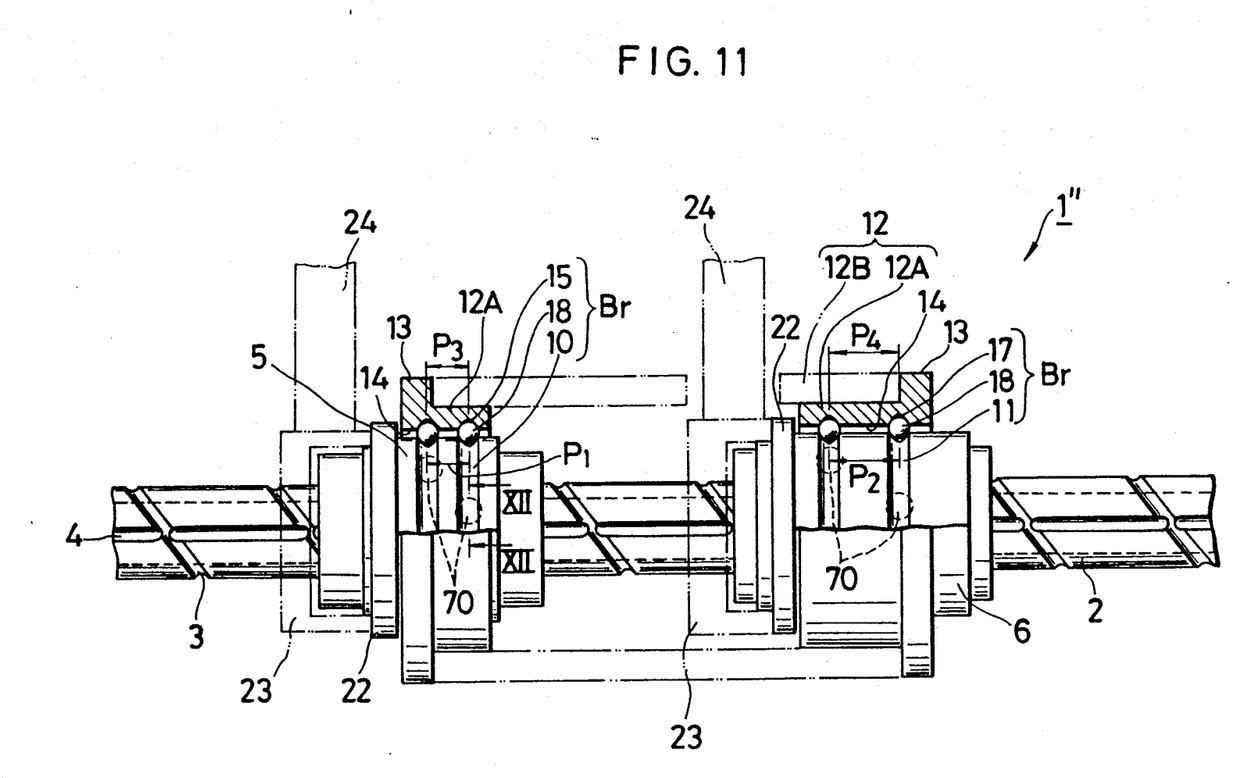
FIG. 11 is an axial cross-section of a ball screw device according to a fifth embodiment of this invention.
Figure 12:
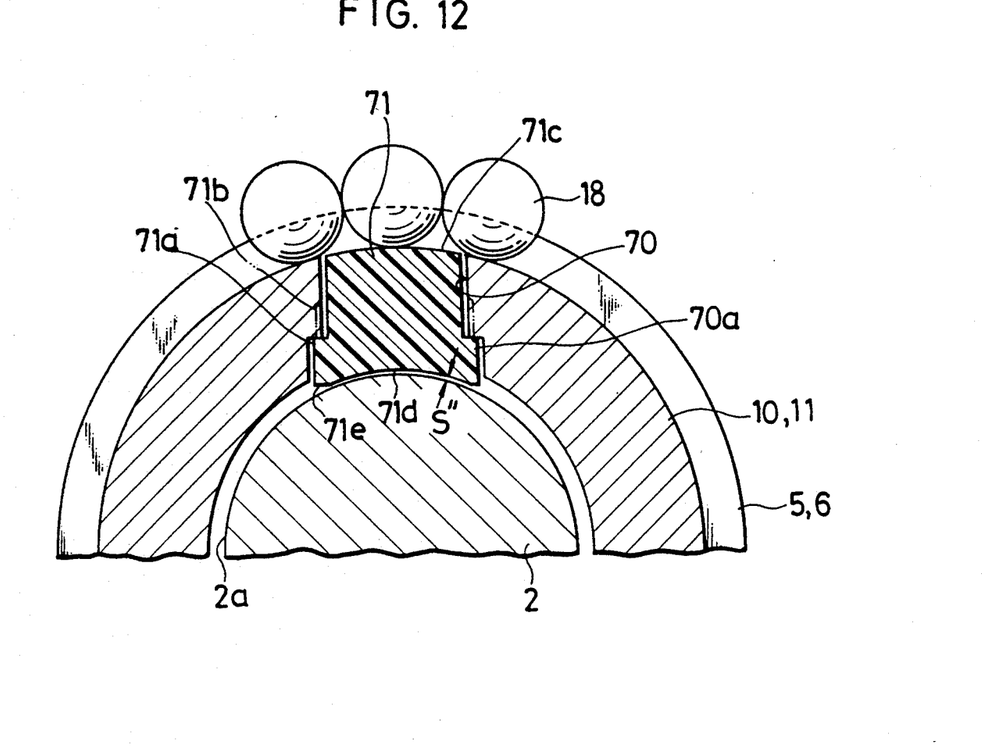
FIG. 12 is an enlarged fragmentary cross-section taken in the direction of arrow XII—XII.

With reference to FIGS. 11 and 12, the ball screw device according to the fifth embodiment of this invention generally indicated at numeral 1″ will be described. In these drawings, like elements of structure similar to the corresponding elements of the first embodiment shown in FIG. 2 through FIG. 6 are identified by like reference numerals and their description is omitted herein.

The walls of the inner race grooves 10,10 for the ball screw nut 5 and those of the inner race grooves 11,11 for the ball spline nut 6 are each provided with at least one ball insertion hole 70 formed therethrough to the inner peripheral wall of the corresponding nut 5 or 6. This ball insertion hole 70 has a size large enough to permit easy insertion of the ball bearings 18 therethrough. A stepped portion 70a is formed at an intermediary part so that the diameter of the ball insertion hole 70 is somewhat greater on the side of the inner peripheral wall of the nut 5 or 6. After a predetermined number of the bearing balls 18 have been inserted outwardly through the ball insertion hole 70 from the side of the inner peripheral wall of the nut 5 or 6, a plug 71 is inserted in the ball insertion hole 70 to close the ball insertion hole 70. The plug 71 is made of a synthetic resin and is provided on an outer peripheral wall thereof with a shoulder 71a, which is brought into engagement with the stepped portion 70a of the ball insertion hole 70, and also with a plurality of axially-extending ridges 71b. An outer end face 71c of the plug 71 has a shape conforming with the shape of the groove wall of the inner race groove 10 (or 11) for the ball screw nut 5 (or the ball spline nut 6) so that the formation of a step is prevented to ensure smooth rotation of the balls 18. On the other hand, an inner end face 71d is formed into a concaved face complementary with the outer peripheral wall 2a of the opposing shaft 2. In addition, the peripheral edge of the inner end face 71d is chamfered flat, thereby providing a chamfered portion 71e.

The ring-shaped, pulley-fixing flanges 22,22 are provided on the ball screw nut 5 and the ball spline nut 6 at the locations adjacent the outer peripheral end portions of the nuts 5,6, respectively. The pulleys 23,23 are mounted on the respective flanges 22,22. These pulleys 23,23 are driven by an unillustrated drive unit by way of their corresponding timing belts 24,24 for precision power transmission.

Operation of the ball screw device 1″ according to the fifth embodiment will next be described.

The assembly of the bearing balls 18 in the ball screw nut 5 and ball spline nut 6 of the ball screw device 1″ is conducted using the respective ball insertion holes 70. Namely, subsequent to insertion of the ball screw nut 5 and ball spline nut 6 in the housing 12, the predetermined numbers of bearing balls 18 are successively fed into the groove spaces, which are defined by the inner race grooves 10,10 (11,11) and the outer race grooves 15,15 (17,17) through the corresponding ball insertion holes 70 from the side of the inner peripheral walls of the nuts 5,6. The plugs 71 are, then, inserted from the side of the inner peripheral walls of the respective nuts 5,6, whereby the ball insertion holes 70 are closed. The insertion the synthetic resin plugs 71 is conducted by pressfitting. By this press-fitting, the ridges 71b on the outer peripheral wall of each plug 71 are flattened so that the plugs 71 are firmly fitted in the corresponding ball insertion holes 70. Since the plugs 71 can be easily fixed by press-fitting as described above, the assembly step of the plugs 71 is simpler than the conventional fixing method relying upon the conventional threaded engagement or adhesive-assisted fixing, so that the work time can be shortened significantly.

The shoulder 71a of each plug 71 fitted in the corresponding ball insertion hole 70 engages the stepped portion 70a of the ball insertion hole 70 so that the plug 71 is protected from falling out by centrifugal force. As a matter of fact, the plug 71 is formed on the side of the inner race and centrifugal forces applied on the plug 71 are small. The shoulder 71a is therefore not essential.

Since the ball insertion holes 70 are provided on the side of the inner race grooves 10,11 as described above, the outer race grooves 15,17 on which large centrifugal force is applied directly during high-speed rotation of the bearing balls 18 can be formed flat and smooth so that smooth rolling of the bearing balls 18 is assured. Further, the thickness of the housing 12A as the outer race of the bearing can be formed with a minimum thickness required for the strength of the bearing without being affected by the plugs 71. This enables a compact design.

After the bearing balls 18 have been inserted, the ball screw nut 5 and ball spline nuts 6 are mounted on the shaft 2. As is illustrated in FIG. 12, the inner end face 71d of each plug 71 faces an outer peripheral wall 2a of the shaft 2 at a clearance S″. This clearance S″ flares out at the chamfered portion 71e of the plug 71. Owing to its wedging effect, the grease applied on the shaft 2 is caused to readily flow into the clearance S″ and at the same time, is compressed there during rotation. Even if the pressfitting of the plug 71 becomes loose and the plug 71 is about to move toward the shaft 2 because of minute vibrations of the ball screw device 1″ during its operation, the plug 71 is forced to float by the high pressure of the grease in the clearance S″ so that the plug 71 is prevented from contacting the shaft 2.

Operation of the ball screw device 1″ so assembled is similar to that of the ball screw device 1 of the first embodiment.

Figure 13:
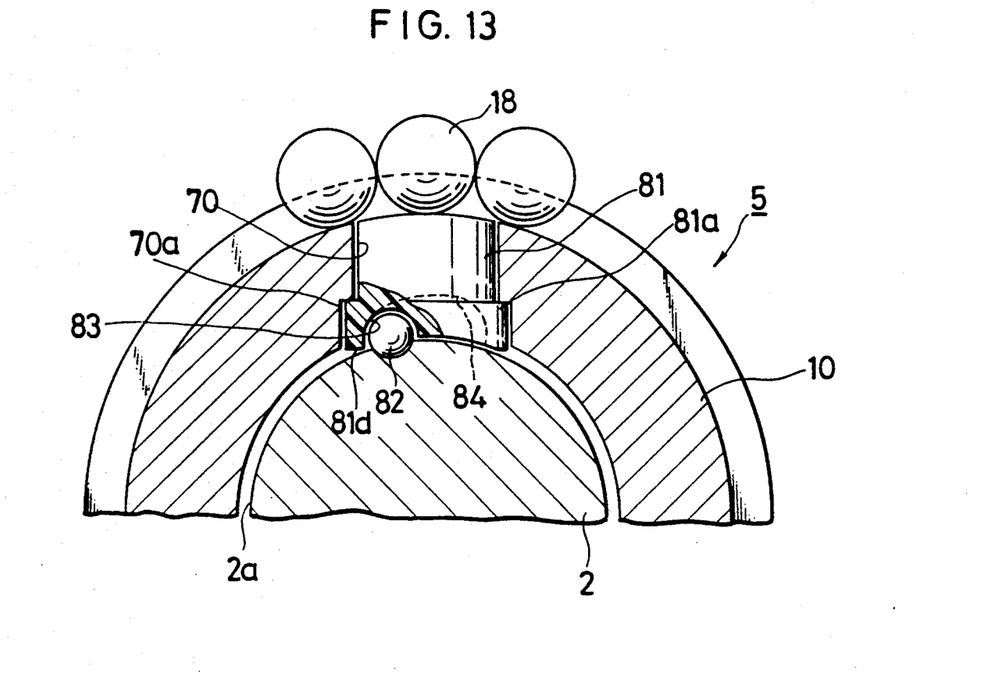
FIG. 13 is a similar view to FIG. 12 but shows a modification of the ball screw device according to the fifth embodiment of this invention.

Finally, the modification of the fifth embodiment will be described with reference to FIG. 13. This modified embodiment is different from the above-described fifth embodiment in that a return path 83 of a recirculation path for balls 82 in the ball screw nut 5 is formed in an inner end face 81d of each plug 81 in the ball screw nut 5. As the shaft 2 and the ball screw nut 5 rotate relative to each other, the balls 82 helically move while rolling in the screw groove and then return to the original position through a return path 84 inside the nut 5. This recirculation is repeated. The inner end face 81d of the plug 81 is always supported by the ball 82, thereby bringing the advantage that the plug 81 can be prevented from falling toward the inner peripheral surface of the nut 5. Further, it is unnecessary to provide each plug 81 with press-fitting ridges 71b so that the manufacturing cost can be reduced correspondingly.

The structure of the plugs in this modified embodiment is suitable for ball screw devices of the type that the pitch of the screw groove 3 formed on the outer peripheral wall of the shaft 2 is small and the balls 82 in the screw groove 3 on the ball screw shaft 2 are repeatedly recirculated to the original position through the return path 84 after turning about the shaft 2.

Other operation and advantages of the modified embodiment are practically similar to those of the fifth embodiment described above.

What is claimed is:

1. In a ball screw device comprising a shaft provided with a ball screw groove and at least one ball spline groove, a ball screw nut and a ball spline nut mounted on the shaft via balls interposed therebetween, and a housing having an inner peripheral wall on which the ball screw nut and ball spline nut are rotatably supported by the virtue of rotation of balls of ball bearings, the improvement comprising a means for applying a selected pre-load without the use of a spacer, said means comprising inner race grooves of the ball bearings formed in the outer peripheral walls of the ball screw nut and the ball spline nut, respectively; said inner peripheral wall of said housing extending continuously and coaxially between said ball screw nut and said ball spline nut; and outer race grooves of the ball bearings formed in the inner peripheral wall of the housing at desired intervals relative to corresponding intervals of the inner race grooves, said outer race grooves supporting said ball screw nut and ball spline nut.

2. The device of claim 1, wherein an oil scraper is threadedly mounted on the shaft between the ball screw nut and the ball spline nut.

3. In a ball screw device comprising a shaft provided with a ball screw groove and at least one ball spline groove, a ball screw nut and a ball spline nut mounted on the shaft via balls interposed therebetween, and a housing having an inner wall on which the ball screw nut and ball spline nut are rotatably supported by the virtue of rotation of balls of ball bearings, the improvement comprising a suction opening is provided through the housing to permit direct evacuation of a closed space surrounded by the housing, ball screw nut, ball spline nut and shaft; and sealing members are arranged on outer peripheries of the ball screw nut and ball spline nut, whereby the closed space is isolated.

4. The device of claim 3, wherein suction holes, which are open in the vicinity of outer end portions of the ball screw nut and ball spline nut and are communicated with the closed space via a clearance between the ball screw nut and the shaft and a clearance between the ball spline nut and the shaft, respectively, are formed through the outer end portions of the ball screw nut and ball spline nut and are open at outer peripheral walls of the outer end portions.

5. In a ball screw device comprising a shaft provided with a ball screw groove and at least one ball spline groove, a ball screw nut and a ball spline nut mounted on the shaft via balls interposed therebetween, and a housing having an inner wall on which the ball screw nut and ball spline nut are rotatably supported by the virtue of rotation of balls of ball bearings, the improvement comprising outer race grooves of the ball bearings are formed in the inner peripheral wall of the housing; inner race grooves of the ball bearings are formed in outer peripheral walls of the ball screw nut and ball spline nut, respectively; ball insertion holes are provided on the inner race grooves of the ball bearings are formed from inner peripheral walls of the ball screw nut and ball spline nut; and plugs are inserted in the insertion holes so that the plugs close the insertion holes without falling out.

6. The device of claim 5, wherein each of the insertion holes is provided with a stepped portion and the corresponding plug has a shoulder portion engaged with the stepped portion, whereby the plug is prevented from dropping outwardly.

7. The device of claim 3, wherein suction holes, which are open in the vicinity of outer end portions of the ball screw nut and ball spline nut in communication with the closed space via a clearance between the ball screw nut and the shaft and a clearance between the ball spline nut and the shaft, respectively, are formed through spacers mounted on axial outer sides of the ball screw nut and ball spline nut and are open at outer peripheral walls of the spacers.

* * * * *